United States Patent [19]

Mannschke

[11] 4,362,360
[45] Dec. 7, 1982

[54] SOCKET FOR A DETACHABLE PLUG AND SOCKET CONNECTION FOR COUPLING AN OPTICAL FIBER AND DETECTOR ARRANGEMENT TO A LIGHT SOURCE

[75] Inventor: Lothar P. Mannschke, Eckental, Fed. Rep. of Germany

[73] Assignee: U.S. Philips Corporation, New York, N.Y.

[21] Appl. No.: 253,485

[22] Filed: Apr. 13, 1981

Related U.S. Application Data

[63] Continuation of Ser. No. 13,585, Feb. 21, 1979, abandoned.

[30] Foreign Application Priority Data

Mar. 1, 1978 [NL] Netherlands ............ 7802231

[51] Int. Cl.³ .................................. G02B 7/26
[52] U.S. Cl. ........................... 350/96.20; 250/227; 250/552
[58] Field of Search ............. 350/96.20, 96.21; 250/227, 551, 552

[56] References Cited

U.S. PATENT DOCUMENTS

| 3,859,536 | 1/1975 | Thiel | 250/551 |
| 3,948,582 | 4/1976 | Martin | 350/96.21 |
| 3,954,338 | 5/1976 | Hennel et al. | 350/96.21 |
| 3,996,526 | 12/1976 | d'Auria et al. | 350/96.20 |
| 4,169,656 | 10/1979 | Hodge | 360/96.20 |
| 4,181,901 | 1/1980 | Heyke | 250/552 |

OTHER PUBLICATIONS

T. Kudo, "New Fiber Cable Transmission systems Use LED Semi-conductor Laser as the Optical Source," Journal of Electronic Engineering, pp. 42-46, Jul. 1976.

*Primary Examiner*—John D. Lee
*Assistant Examiner*—Frank Gonzalez
*Attorney, Agent, or Firm*—Marc D. Schechter

[57] ABSTRACT

The invention relates to a socket for a plug and socket connection for coupling an optical fiber used in optical telecommunication systems. The socket comprises a light detector for converting the light radiated adjacent the optical fiber into an electrical signal for controlling the power dissipation of the light source.

7 Claims, 5 Drawing Figures

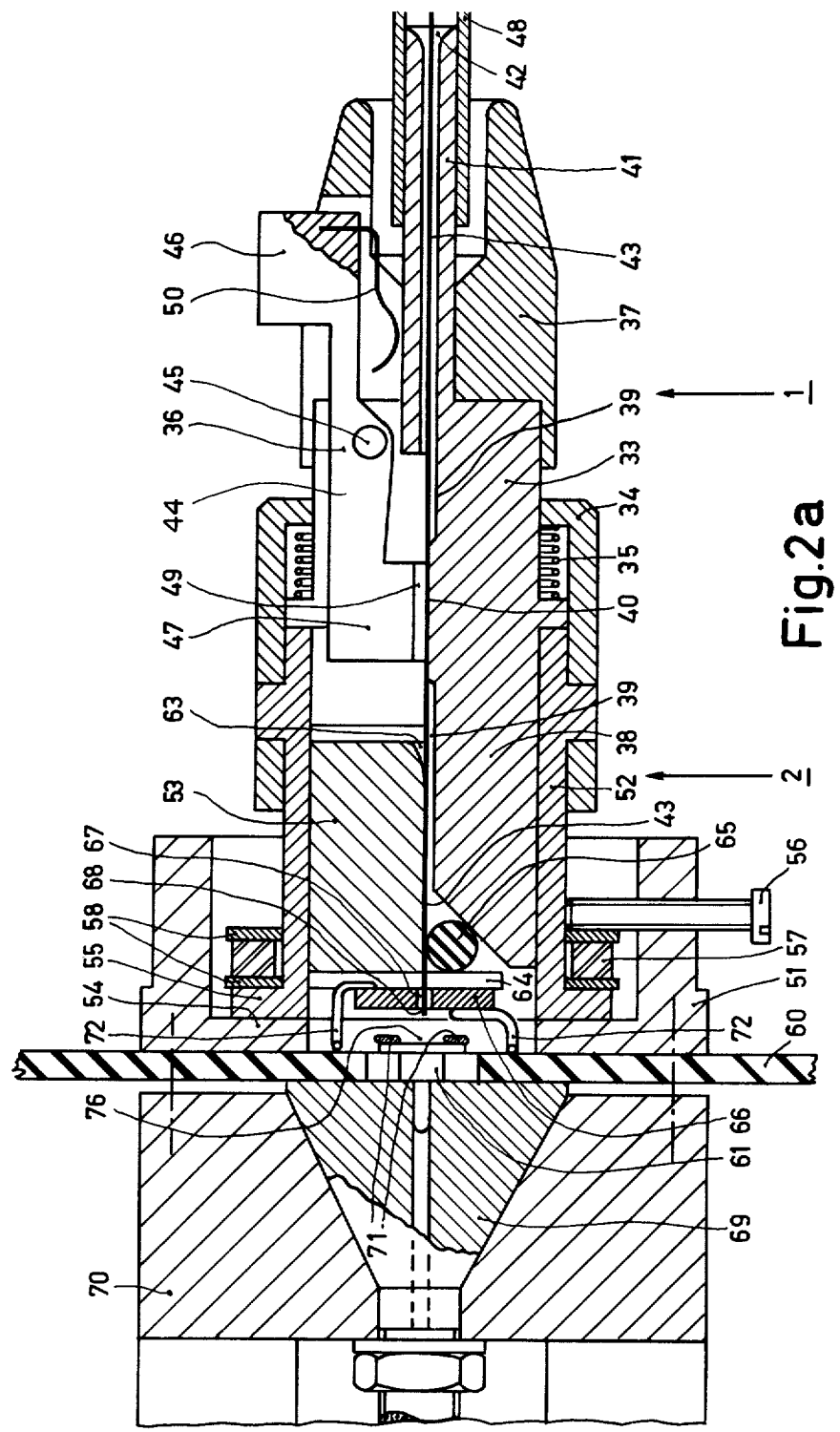

SOCKET FOR A DETACHABLE PLUG AND SOCKET CONNECTION FOR COUPLING AN OPTICAL FIBER AND DETECTOR ARRANGEMENT TO A LIGHT SOURCE

This is a continuation of application Ser. No. 013,585, filed Feb. 21, 1979, now abandoned.

BACKGROUND OF THE INVENTION

The invention relates to a socket, for a detachable plug and socket connection, for coupling an optical fiber to a semiconductor light source. The plug and socket connection further comprises a plug. The socket comprises an optical fiber extending in the socket from a plug end to a light source end.

Such a socket is disclosed in U.S. Pat. No. 3,948,582 which corresponds to United Kingdom Patent Specification No. 1,456,395 and is used in optical communication systems in which light pulses of a high frequency are transmitted by means of optical fibers. In such a system, as described in the Japanese monthly "Journal of Electronic Engineering", July 1976, pages 42-46, it is necessary to control the power dissipated by the light source. A portion of the emitted light is caught by a first optical fiber and passed on for communication purposes. Another portion of the light is guided by a second optical fiber to a photodiode. An electric signal from the photodiode, generated by the light incident thereon, is used for controlling the power dissipated by the semiconductor light source. Such an arrangement has the drawback that two optical fibers must be oriented with respect to the semiconductor light source and that the photodiode must, at least partly, also be oriented to a certain extent with respect to the fibers.

SUMMARY OF THE INVENTION

It is an object of the invention to provide a socket for a plug and socket connection wherein an electrical signal, which is a measure of the power dissipated in the light source, is obtained with simple means.

A socket according to the invention is therefore characterized in that a semiconductor light detector is arranged at the light source end of the socket adjacent to a fiber guide. Such a socket has the advantage that the light, emitted by the light source and radiated away from a fiber disposed in the fiber guide, is utilised, at least partly, by the light detector arranged adjacent to the fiber guide.

A preferred embodiment of a socket according to the invention is characterized in that the light detector is disc-shaped and has a bore in which the fiber guide ends. Such a light detector in the described position effectively utilises the light generated by the light source.

A further embodiment of a socket according to the invention is characterized in that the light detector is in mating contact with a light-emitting surface of a light source. The light source and the light detector are molded in a synthetic resin sleeve in which fiber guide is formed. This sleeve comprises an intermediate member provided with a further fiber guide abutting the first fiber guide for accomodating an end of an optical fiber secured in the plug. Such a socket forms a rapidly exchangeable unit for an optical communication system.

Yet a further embodiment of a socket according to the invention is characterized in that the socket has an outer can and an inner member included therein. The inner member has a fiber guide, the light detector being secured adjacent thereto. The outer can has mounting means, for mounting the socket on a support for the light source, and adjusting means, for positioning the inner member with respect to the light source. Such a socket has the advantage that the light detector and the fiber end can simultaneously, and to the same extent, be readjusted with respect to the light source by means of the same adjusting means.

A strong but simple construction for a socket according to the invention is characterized in that the outer can has a bearing surface and that the inner member has a flange, bearing on the bearing surface. The adjusting means comprises set screws secured in the outer can and whose ends bear against the inner member. A ring-shaped resilient element is disposed between the ends of the set screws and the inner member flange.

The socket according to the invention can be used to great advantage in all those applications which use a light source emitting light from one side only. Such a light source is, for example, a light emitting diode.

The invention will be further explained with reference the examples shown in the drawing.

BRIEF DESCRIPTION OF THE DRAWING

FIGS. 2a, 2b, and 2c are each cross-sections through a preferred embodiment of a socket and a plug of a plug and socket connection according to the invention, a cross-section through a socket, and a top view of the socket, respectively.

DESCRIPTION OF THE PREFERRED EMBODIMENTS

Figure 1A:
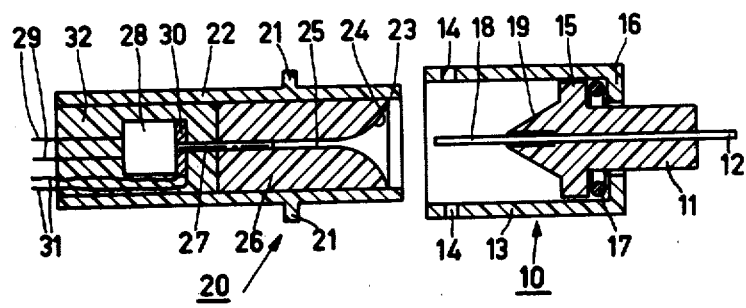
FIG. 1a is a cross-section through an embodiment of a socket and a plug of a plug and socket connection according to the invention.

The plug and socket connection shown in FIG. 1a has a plug 10 and a socket 20. The plug 10 comprises a fiber container 11, in which an optical fiber 12 is secured, and a cap 13. The cap 13 is provided with L-shaped slots 14 by means of which, in conjunction with keys 21 formed at a housing 22 of the socket 20, the plug 10 is fittable in the socket 20. The fiber container 11 is pushed by means of its shoulder 15 against the edge 23 of the sleeve 22 by a resilient washer 17 arranged between the shoulder 15 and a rear wall 16 of the cap 13.

For easy insertion of the fiber into end 18 of socket 20, the lead-in opening 24 of the fiber guide 25 in the intermediate member 26 is flared. The flared lead-in opening 24 is in mating contact with the conical front end 19 of the fiber container 11, when the plug 10 is fully inserted in the socket 20. The fiber end 18, introduced in the fiber guide 25 should optically connect with a light-conducting element 27, for example a length of an optical fiber. The other side of the light-conducting element 27 is in mating contact with a light-emitting diode 28. The diode 28 is provided with leads 29 and is secured in the sleeve 22 in a manner to be described hereinafter. A photodiode 30 is in mating contact with the light-emissive diode 28. The diode 30 has leads 31 and a bore through which an end of the light-conducting element 27 is inserted. The bore is very accurately matched to the diameter of the light-conducting element 27. Such an arrangement has the advantage that the light emitted by the light emitting diode 28 is received by both the light-conducting element 27 and the diode 30, the latter converting the light into a useful electric signal.

The end of the element 27, the photodiode 30 and the light emitting diode 28 form one assembly and are molded as such in the portion 32 of the sleeve 22 in, for example, polycarbonate. Consequently, the socket 20 is a rapidly exchangeable component for an optical communication system.

Figure 1B:
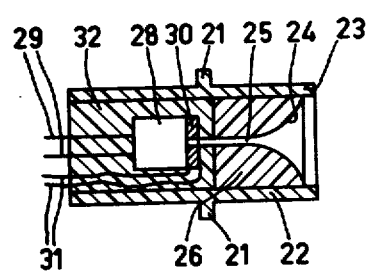
FIG. 1b shows a cross-section of a further embodiment of a socket according to the invention.

The cross-section through a socket according to the invention, shown in FIG. 1b, is roughly identical to the socket shown in FIG. 1a. The same reference numerals are therefore used for the same components. The sockets shown in the FIGS. 1a and 1b differ because the light-conducting element 27 is missing in the socket shown in FIG. 1b. This has the advantage that the light emitted by the light-emitting diode 28 is directly radiated to the fiber end 18. The elimination of the transition from the light-conducting element 27 to the fiber end 18 reduces overall losses. A socket, as shown in FIG. 1b, can be produced by using a temporary metal wire to block the opening the fiber guide 25 during the hardening of the synthetic resin material mass 32.

The cross-section through a plug 1 and a socket 2, shown in FIG. 2a, is a cross-section through a symmetry plane of both of these components. The plug 1 comprises a fiber container 33, a fitting cap 34, a pressure spring 35, a clamping device 36 and a protective cap 37. A tenon 38 is formed at the fiber container 33. The clamping device 36 is secured in a slot in the fiber container 33, the bottom of the slot connecting up with one side of the tenon 38. A groove 39, which extends in a straight line across the side of the tenon 38 is formed in the bottom. In addition, a lead-in pipe 41, having a flared led-in opening 42 at one side and leading into the groove 39 at the other side is formed at the fiber container 33. An optical fiber 43 is passed into the groove 39 in the slot and into tenon 38 via the lead-in pipe. The clamping device 36 locks the fibers 43 after insertion into the fiber container 33. To that end the clamping device 36 has a lever 44 which is rotatable around a shaft 45. One side of the lever 44 is provided with a push-button 46 and the other side with a pressure piece 47. A resilient washer 49, which pushes the optical fiber 43 into groove 39 by means of the tension of a return spring 50, is secured to the pressure piece 47. At the location of the resilient washer 49 the groove 39 becomes a V-shaped groove 40 in which the fiber 43 is clamped by the tension of the spring 50. The return spring 50 can be a leaf spring secured under the push-button 46 and bearing on the lead-in pipe 41. A protective sleeve 48 is fitted to the lead-in pipe 41 for the protection of the fiber 43.

Figure 2C:
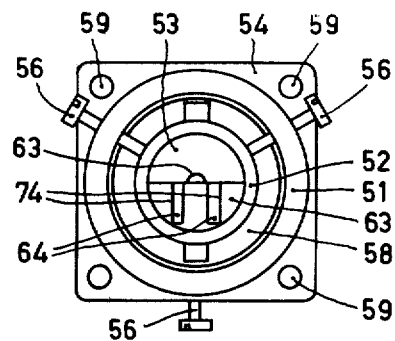
Figure 2B:
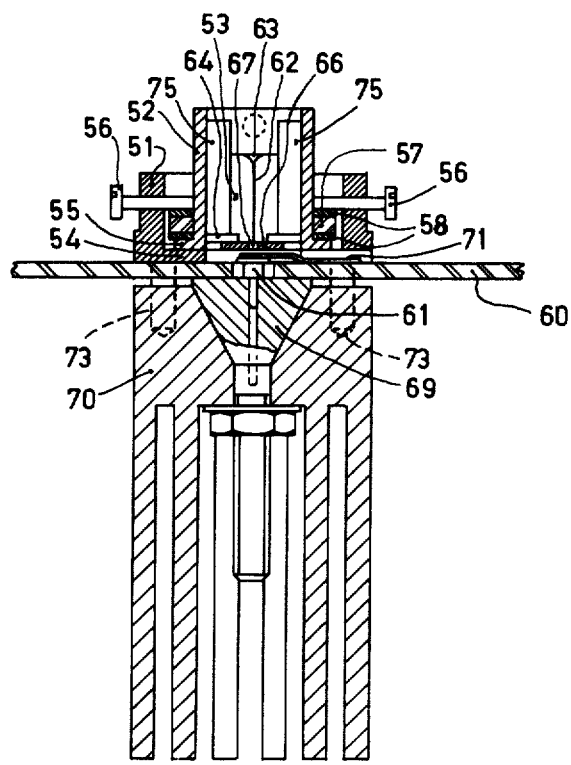

The socket 2 according to the invention, shown in the FIGS. 2a, 2b and 2c comprises an outer can 51 and an inner member comprising a sleeve 52 and an intermediate member 53. A bearing surface 54, on which the sleeve 52 bears by means of a flange 55 formed thereon, is formed at the outer can 51. Three set screws 56, by means of which the position of the sleeve 52 is adjustable with respect to the outer can 51, are fitted in the outer can 51. Arranged between the ends of the set screws 56, which bear on the sleeve 52, and the flange 55, is a ring-shaped, spring-fitted element 57 between two discs 58 by means of which the flange 55 is pushed onto the bearing surface 54. As shown in FIG. 2c the bearing surface extends to outside the circumference of the outer can 51 and is provided there with threaded holes 59 by means of which the socket 2 is mountable to a support 60, as shown in FIGS. 2a and 2b.

A light source 61 is fitted on the support 60. The intermediate member 53, present in the inner portion of socket 2, is provided with a V-shaped fiber guide 62 having a semi-flared belled mouth 63 into which a fiber 43, secured in the fiber container 33, is inserted. To enable easy introduction of the fiber 43 into the V-shaped groove 62, the intermediate member 53 is provided with guide walls 74 and guide pins 75, which, in conjunction with the tenon 38 allow only one manner of introduction of the plug 1 into the socket 2. At the light source end, the intermediate member 53 is provided with support 64, one side of which bears an elastic cushion 65, a light detector 66 being attached to the other side. The light detector 66 has a central hole 67 through which an end 68 of the optical fiber 43 protrudes. The most advantageous position of the light detector 66 and the fiber end 68 with respect to the light source 61 can be obtained by means of the set screws 56. For clarity, the ratio of the hole and fiber diameters are not shown in the proper proportion. In actual practice, the hole has a diameter which is equal to $1\frac{1}{2}$ to 2 times the diameter of the optical fiber.

The presence of cushion 65 in the socket 2 is not absolutely necessary. With a sufficiently accurate positioning of the photodiode 66 and dimensioning of the hole 67, the fiber end 68 will easily be passed through the hole 67 from the V-shaped groove 62.

The support 60, on which the socket 2 is secured, is here a printed circuit board against which a mounting clamp 69 for the light source 61 is clamped by means of a cooling member 70. The cooling member 70 is secured to the support 55 of the socket by means of screws. The light source 61 is a light-emitting diode, which is in electrical contact with an electric circuit on the printed circuit board via a contact spring 71 and via the mounting clamp 69. The contact spring 71 is provided with an aperture 76 which leaves a free area in the center of the light source 61 in order not to block the light-emitting surface thereof. The light detector 66 is connected to another electric circuit on the printed circuit board via two contacting wires 72. Sufficient space must be left between the supports 64 and the light emitting diode to allow room for the wires 72.

What is claimed is:

1. A socket provided with a light source, for a detachable plug and socket connection for coupling an optical fiber to the light source, comprising:
    an intermediate member, having a light source end near the light source and having a plug end, said member having a fiber guide therein extending from the light source end to the plug end, said light source emitting light such that a first portion of the light is emitted in a direction toward the fiber guide such that, in the absence of intervening obstacles, the first portion of light will enter the fiber guide, and a second portion of the light is emitted in a direction away from the fiber guide such that regardless of whether or not there are intervening obstacles the second portion of light will not enter the fiber guide; and
    a light detector disposed adjacent to the fiber guide at the light source end in such a manner as to receive at least part of the second portion of light emitted by the light source.

2. A socket provided with a semiconductor light source, for a detachable plug and socket connection for coupling an optical fiber to the semiconductor light source, comprising:
- an intermediate member, having a light source end near the light source and having a plug end, said member having a fiber guide therein extending from the light source end to the plug end; and
- a disc-shaped semiconductor light detector disposed adjacent to the fiber guide at the light source end and having a hole in which the fiber guide ends.

3. A socket as claimed in claim 1 or 2, wherein:
- the fiber guide in the intermediate member is for accommodating an end of an optical fiber secured in the plug; and
- the light detector is in mating contact with a light-emitting surface of the light source, the light source and detector being cast in synthetic resin in which a second fiber guide is formed, the second fiber guide being in mating contact with the fiber guide in the intermediate member.

4. A socket as claimed in claim 3, wherein one end of an optical fiber is in mating contact with the light-emitting surface of the light source and is cast in the synthetic resin, the other end of the fiber terminating in the fiber guide in the intermediate piece.

5. A socket as claimed in claim 1 or 2, wherein the socket further comprises an outer can and an inner member, disposed in the outer can, said inner member including the intermediate member, said outer can comprising mounting means for mounting the socket on a support for the light source and adjusting means for positioning the inner member with respect to the light source.

6. A socket provided with a light source, for a detachable plug and socket connection for coupling an optical fiber to the light source, comprising:
- an intermediate member, having a light source end near the light source and having a plug end, said member having a fiber guide therein extending from the light source end to the plug end, said light source emitting light such that a first portion of the light is directed into the fiber guide, and a second portion of the light is directed away from the fiber guide;
- a light detector disposed adjacent to the fiber guide at the light source end in such a manner as to receive at least part of the second portion of light emitted by the light source;
- an outer can;
- an inner member disposed in the outer can, said inner member including the intermediate member, said outer can comprising mounting means for mounting the socket on a support for the light source; and
- adjusting means for positioning the inner member with respect to the light source;
- wherein the outer can has a bearing surface and the inner member has a flange which bears upon the bearing surface, the adjusting means being set screws fitted in the outer can and whose ends engage the inner member, said socket further comprising a ring-shaped resilient element spaced between the set screw ends and the flange of the inner member.

7. A socket provided with a semiconductor light source, for a detachable plug and socket connection for coupling an optical fiber to the semiconductor light source, comprising:
- an intermediate member, having a light source end near the light source and a plug end, said member having a fiber guide therein extending from the light source end to the plug end;
- a disc-shaped semiconductor light detector disposed adjacent to the fiber guide at the light source end and having a hole in which the fiber guide ends;
- an outer can;
- an inner member disposed in the outer can, said inner member including the intermediate member, said outer can comprising mounting means for mounting the socket on a support for the light source; and
- adjusting means for positioning the inner member with respect to the light source;
- wherein the outer can has a bearing surface and the inner member has a flange which bears upon the bearing surface, the adjusting means being set screws fitted in the outer can and whose ends engage the inner member, said socket further comprising a ring-shaped resilient element spaced between the set screw ends and the flange of the inner member.

* * * * *